United States Patent Office 3,321,433
Patented May 23, 1967

---

3,321,433
METHOD OF IMPROVING THE PROCESSABILITY OF POLYURETHANE POLYMERS
Gert F. Baumann, Bridgeville, Pa., assignor to Mobay Chemical Company, Pittsburgh, Pa., a corporation of Delaware
No Drawing. Filed June 2, 1964, Ser. No. 372,076
7 Claims. (Cl. 260—30.2)

This invention relates to a method of improving the processability of polyurethane polymers and more particularly, to a method for reducing the nerve or memory of a polymer on a suitable milling apparatus and increasing the flow of the polymer in extrusion or injection molding.

Substantially linear polyurethanes are widely known in the urethane art. These polymers are prepared by reacting an organic compound containing active hydrogen atoms, such as, a polyester or a polyether with an organic diisocyanate and a chain-extender or mixture of chain-extenders to produce a polymer having substantially no NCO groups remaining. This is achieved by controlling the equivalents of the active hydrogen compounds in the reactive mixture with respect to the amount of the isocyanate which is added. When the quantity of isocyanate added in the reactive mixture is close to unity or slightly above unity, the resulting polymer is thermoplastic and does not require the addition of a curing agent, such as more isocyanate to achieve the final desired properties. When the quantity of isocyanate is sufficiently less than unity, the resulting gum requires the addition of more isocyanate or other curing agent to produce objects having the desirable physical characteristics. In either event, the material in many cases must be milled on apparatuses such as two-roll mills used in the rubber industry, in order to incorporate therein other suitable materials, such as pigments, fillers, plasticizers, curing agents and the like, or otherwise processed as a melt. In many instances, depending upon the initial reaction formulation, the polymer exhibits a snappy, nervy characteristic on the mill. This means that the polymer will not form a smooth band around one of the rolls of the mill and will tend to pull back off the mill, thus making it difficult to uniformly incorporate additives or curing agents. These materials also are difficult to fabricate into desirable objects by thermoplastic procedures such as extrusion, calendering and the like, because they will not take the shape of the die through which they are passed. Thus, even when these materials are forced under pressure through a die having a certain configuration, they will spring back to a shape which is not recognizable from the configuration of the die immediately after leaving the die.

It is therefore an object of this invention to provide an improved method of preparing thermoplastic polyurethane polymers. It is another object of this invention to provide a method for reducing the nerve of polyurethane polymers. It is still another object of this invention to provide a method for improving the processing conditions of polyurethane polymers. It is a further object of this invention to convert snappy, nervy polyurethane polymers into softer, more linear polymers which can be readily shaped by established thermoplastic fabrication methods.

The foregoing objects and others which will become apparent from the following description are accomplished in accordance with the invention generally speaking by providing a method for improving the processability of polyurethane polymers having an NCO content less than one percent by weight by adding small quantities of a urea compound having the formula:

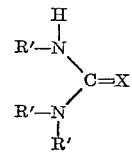

or

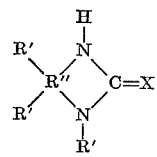

wherein X is oxygen or sulfur, R' is hydrogen, aryl or alkyl having 1–18 carbon atoms and can be the same or different in the same molecule and R'' is an alkylene radical having from 1–3 carbon atoms with the further provision that R' in the first formula set forth is hydrogen or alkyl at least once. The quantity of the urea is very small and should be added in an amount of from about 0.0001 to about 0.05 mol of urea per 100 parts of the urethane polymer. For best results, it is preferred to add the urea in an amount of from about 0.001 to about 0.005 mol of urea per 100 parts of the polyurethane polymer.

Thus, the invention contemplates the improvement in the processing of polyurethane polymers by the addition of the stated quantities of the urea compounds set forth above to reduce the nerve and snappiness of the particular elastomer and improve its flow, thus render it processable by techniques known in the art.

In practicing the process in accordance with this invention, the polyurethane polymer can be placed on a heated mill until it forms a band around one of the rolls or comes as close as possible to forming a band as the particular polymer is capable of. Because of the snappiness and nerviness of many of the polymers, it is many times difficult to make the polymer stay on the mill. The particular urea compound to be used is then added gradually to insure its uniform distribution into the urethane polymer and thus reduce the possibility of high localized concentration. As the urea compound is dispersed throughout the urethane polymer, the millability of the polymer will be noticeably improved and the optimum quantity of urea added can be determined readily by visual observations. The polymer will form a smooth band on the mill. Many times, not only is the millability improved by the process of this invention, but also the temperature is decreased at which the urethane polymer can be milled and thus eventually fabricated such as by extruding, calendering and the like. This is important in many instances where higher temperatures on the mill cause degradation of the polymer. Ureas can also be incorporated in a Banbury or like mixing devices or in an extruder.

Any suitable polyurethane polymer having an NCO content less than one percent by weight and is prepared by reacting an organic compound containing active hydrogen atoms which are reactive with NCO groups and a suitable chain-extending agent with an organic diisocyanate can be used in the practice of this invention. Any suitable organic compound containing active hydrogen atoms can be used in the preparation of the polyurethane polymers such as, for example, hydroxyl polyesters, polyalkylene ether glycols, polyalkylene thioether glycols, dihydric polyacetals and the like.

Any suitable dihydric polyester may be used as, for example, the reaction product of a dicarboxylic acid and a dihydric alcohol. Any suitable dicarboxylic acid can be used in the preparation of the polyester such as, for example, adipic acid, succinic acid, sebacic acid, suberic acid, oxalic acid, methyladipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable dihydric alcohol may be used in the reaction with the dicarboxylic acid to form a polyester such as, for example, ethylene glycol, propylene glycol, 1,4-butanediol, 1,3-butanediol, 2,3-butanediol, pentanediol, hexanediol, bis-(hydroxy-methyl-cyclohexane), xylylene glycol and the like. Of course, the hydroxyl polyester may contain urethane groups, urea groups, amide groups, chalkogen groups and the like. Thus, the term "dihydric polyester" also includes hydroxyl terminated polyester amides, polyester urethanes, polyetheresters and the like. Any suitable polyester amide may be used such as, for example, the reaction product of an amine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethylamine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds. Further, in the preparation of the polyester or polyester amide, hydroxycarboxylic acids, lactones, amino-carboxylic acids, cyclic carbonates and the like may be used, such as, for example, caprolactone, caprolactams, glycine, amino-caproic acid, hydroxybutyric acid and the like.

Any suitable polyalkylene ether glycol may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, the condensates of ethylene oxide, propylene oxide, butylene oxide, amylene oxide, and mixtures thereof. The polyalkylene ether glycols prepared from tetrahydrofuran may be used. The polyalkylene ether glycols may be prepared by any known process such as, for example, the process described by Wurtz in 1859, and in the "Encyclopedia of Chemical Technology," volume 7, pages 257–262, published by Interscience Publishers in 1951, or in U.S. Patent 1,922,459.

Any suitable polyalkylene thioether glycols may be used such as, for example, the reaction product of one of the aforementioned alkylene oxides used in the preparation of the polyalkylene ether glycol with a polyhydric thioether such as, for example, thiodiglycol, 3,3'-dihydroxy propylsulfide, 4,4'-dihydroxy butylsulfide, 1,4-(β-hydroxy ethyl)phenylene dithioether and the like. Any thioether prepared in accordance with German Patent 1,039,232 may be used.

Any suitable dihydric polyacetal may be used such as, for example, the reaction product of an aldehyde with a dihydric alcohol. Any suitable aldehyde may be used such as, for example, formaldehyde, paraldehyde, butyraldehyde and the like. Any of the dihydric alcohols mentioned above with relation to the preparation of polyesters may be used. Any of the polyacetals prepared in accordance with German Patents 1,039,444 and 1,045,095 and U.S. Patent 2,870,097 may be used in the process of this invention.

It is preferred that the organic compound having two alcoholic hydroxyl groups have an equivalent weight of at least about 500 and preferably from about 500 to about 2500. For best results, the equivalent weight should be from about 750 to about 1250.

Any suitable organic diisocyanate may be used in the process of this invention for the preparation of the substantially linear polyurethane polymers such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, isomeric mixtures of 2,4- and 2,6-tolylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate and the like. It is preferred that the diisocyanate has a melting point below 70° C. and for best results, below 40° C. It is also preferred that aromatic diisocyanates be used. For best results, it is preferred to use 2,4-tolylene diisocyanate and isomeric mixtures thereof and 4,4'-diphenylmethane diisocyanate.

Any suitable chain-extender or mixture of chain-extenders can be used in the preparation of the polyurethane polymer such as, for example, water, dihydric alcohols, amino alcohols, organic diamines and the like.

Any suitable dihydric alcohol may be used in the amount set forth above in the preparation of thermoplastically processable polyurethane polymers in accordance with this invention such as, for example, those containing carbon chains which are either uninterrupted or which are interrupted by oxygen or sulfur linkages such as, for example, 1,2-ethanediol, 1,2-propanediol, styrene glycol, isopropyl-α-glyceryl ether, monoacetin, monobutyrin, pinacol (2,3-dimethyl-2,3-butanediol), dibutyl tartrate, 1,3-propanediol, 1,3-butanediol, 2,2-dimethyl-1,3-propanediol, 2,2-diethyl-1,3-propanediol, 2-ethyl-2-butyl-1,3-propanediol, 2 - methyl - 2,4 - pentanediol, 2,2,4-trimethyl-1,3-pentanediol, 2-ethyl-1,3-hexanediol, 1,4 - butanediol, 2-butene-1,4-diol, 2-butyne-1,4-diol, 2,5-hexanediol, 2,5-dimethyl-3-hexyne-2,5-diol, 1,5-pentanediol, dihydroxycyclopentene, 1,6-hexanediol, 1,4 - cyclohexanediol, 4,4'-cyclohexanedimethylol, thiodiglycol, diethylene glycol, dipropylene glycol, 2-methyl-2,3-butanediol, 2-methyl-1,3-propanediol, 2-methyl-2-ethyl-1,3-propanediol, 2,2,4,4 - tetramethyl-1,3-cyclobutanediol, dihydroxyethyl ether of hydroquinone, hydrogenated bisphenol A, dihydroxyethyl terephthalate dihydroxymethyl benzene and the like. The dihydric alcohol may contain minor amounts of trifunctional alcohols such as, for example, glycerine, trimethylol propane.

Any suitable amino alcohol may be used such as, for example, amino ethyl alcohol, amino butyl alcohol, amino isobutyl alcohol, amino propyl alcohol, amino isopropyl alcohol and the like. Any suitable organic diamine may be used such as, for example, ethylene diamine, propylene diamine, butylene diamine, hexamethylene diamine, xylylene diamine, tolylene diamine, 4,4' - diaminodiphenylmethane, 4,4'-methylene bis(2-chloroaniline), phenylene diamine, 4,4'-diphenylene diamine and the like. It is preferred that a mixture of a dihydric alcohol having an equivalent weight of from about 30 to about 130 and water is used as the chain-extending agent. However, it is pointed out that this invention contemplates any polyurethane polymer which is substantially free of NCO groups such as those disclosed in U.S. Patents 2,729,618, 2,929,800, 2,948,691, 3,102,875 and in U.S. applications Ser. Nos. 302,245 and 302,567.

Any suitable urea compound within either of the formulas set forth above may be used. In these formulas R' can be hydrogen, aryl or any alkylene radical having 1–18 carbon atoms. Any suitable aryl radical may be used, such as, for example, phenyl, naphthyl, tolyl, ethyl-phenyl and the like. Any suitable alkyl radical having from 1–18 carbon atoms is represented by R' such as, for example, methyl, ethyl, n-propyl, isopropyl, n-butyl, isobutyl, sec-butyl, t-butyl, n-pentyl and various positional isomers thereof such as, for example, 1-methyl-butyl, 2-methyl-butyl, 3-methyl-butyl, 1,1-dimethylpropyl, 1,2-dimethylpropyl, 2,2-dimethylpropyl, 1-ethylpropyl and the like; corresponding straight and branched chain isomers of hexyl, heptyl, octyl, nonyl, decyl, undecyl, dodecyl, tridecyl, tetradecyl, pentadecyl, hexadecyl, heptadecyl, octadecyl and the like.

It is essential that the urea compound has at least one active hydrogen atom which is set forth in each of the formulas. It is also essential in the first formula listed that R' is hydrogen or alkyl at least once. If either of these conditions is not present, such as, if a compound such as tetramethyl urea, tetrabutyl urea or triphenyl urea is used, only a plasticizing effect is noted by the addition to the urethane polymer. However, when compounds within the formula represented are used, the viscosity of the urethane polymer is much more greatly reduced and the nerve and snappiness of the polymer is also greatly reduced.

Any suitable compound within the formula shown above may be used such as, for example, urea, N,N'-diethyl urea, N,N'-dimethyl urea, N,N,N'-triethyl urea, N,N,N'-trimethyl urea, N,N,N'-tripropyl urea, N,N'-dibutyl urea, N,N'-dioctadecyl urea, N,N,N'-triisobutyl urea, N-ethyl-N'-butyl urea, N-ethyl-N',N'-dibutyl urea, N-phenyl-N'-ethyl urea, N,N-diethyl-N'-phenyl urea, N,N-diphenyl-N'-ethyl urea, N-butyl-N'-naphthyl urea, N,N'-ditertiary butyl-N'-tolyl urea, N,N'-dodecyl urea, N-hexyl-N'-hexadecyl urea, methylene urea, 1-propylene urea, 1,2-ethylene urea, 1,2-butylene urea, 1,2-ethylene-N-phenyl urea, 1,2-ethylene-N-methyl urea, 1,3-trimethylene urea, 1,3-(γ-methyltrimethylene) urea, 1,3-trimethylene-N-phenyl urea, 1,3-trimethylene-N-butyl urea and the corresponding thioureas and the like.

The invention is further illustrated but not limited by the following examples in which parts are by weight unless otherwise specified.

EXAMPLE 1

*Preparation of a suitable gum*

About 1690 parts of a dihydroxyl polyester having a molecular weight of about 2000 and an hydroxyl number of about 56 prepared by reacting 10 mols of adipic acid with 11 mols of a mixture of equal parts of ethylene glycol and butanediol, about 171 parts of 1,2-propanediol, about 24.3 parts of water, about 0.75 part of 2,4,6-trichlorophenol and about 1.2 parts of stannous octoate are mixed with about 767 parts of an isomeric mixture of 80 percent 2,4- and 20% 2,6-tolylene diisocyanate. This reactive mixture has an NCO to OH ratio of 0.98. The reaction mixture is cast into a polypropylene container wherein it initially foams and expands in volume to about 30 times its original volume whereupon it collapses and solidifies into a nervy, snappy gum. This gum forms a rough, lumpy band on a two roll mill heated to a temperature of 260° F.

TABLE 1

| Urea | Parts/100 Parts of Polymer | Results |
| --- | --- | --- |
| Control | 0 | Nervy, rough band. |
| N-ethyl urea | 2 | Smooth band formed. |
| N,N'-diethyl urea | 2.6 | Do. |
| N,N'-dimethyl urea | 2.0 | Do. |
| N-ethyl-N'-butyl urea | 3.3 | Do. |
| N-ethyl-N,N'-dibutyl urea | 4.5 | Do. |
| N-phenyl-N'-butyl urea | 4.3 | Do. |
| N,N-dibutyl N'-phenyl urea | 5.6 | Do. |

Table 1 indicates the results obtained when various quantities of different ureas are added to the polymer on the mill. In each case, the urea is added over an extended period of time to insure uniform dispersion throughout the polymer.

In all of the experiments set forth in Table 1, the viscosity, as determined in a Brabender plastograph with a Banbury attachment, is greatly reduced. This apparatus, which is widely used in the plastics industry, measures viscosity in meter grams and is an indication of the torque transmitted through the material being treated. In addition to the decrease in viscosity, the nerve and snappiness of the elastomer is also reduced and it is the improvement in these two latter properties which are those sought by the process of this invention. When urea compounds such as, tetramethyl urea, tetrabutyl urea or triphenyl urea, which are not within the formulas shown, are used only a plasticizing effect is noted. That is, the viscosity measured by the Brabender is only slightly decreased without a corresponding decrease in nerve and snap.

EXAMPLE 2

To 100 parts of the polyurethane polymer described in Example 1 is added 0.9 part of N,N-dibutyl-N'-phenyl urea. The polymer forms a rough nervy band on the mill at 260° F. but upon the addition of the stated quantity of the urea, a smooth band is formed at 230° F. The original polymer cannot be extruded into a desired cross-sectional configuration even at 260° F. The polymer, after the addition of the urea, is easily extruded at 230° F. into a thread having a uniform cross-sectional dimension.

EXAMPLE 3

A solid urethane polymer is prepared by reacting about 100 parts of a polyester, prepared by reacting 11 mols of ethylene glycol with 10 mols of adipic acid and having a molecular weight of 2,000, about 40 parts of 4,4'-diphenylmethane diisocyanate and about 9 parts 1,4-butanediol for about 15 minutes at about 110° C. The resulting solid mass is then ground and pelletized in a standard extruder. The pellets are dry-blended with about 0.5 part urea per 100 parts of urethane polymer, melted and mixed in a Banbury at about 180° C. for about 10 minutes. The Banbury is attached to a Brabender plastograph which continuously registers the torque of the sample exerted on the drive motor. The "consistency" reading decreases considerably for the sample containing the urea as compared with the "consistency" of the same urethane polymer without the urea. The values are 500 mg. and 2,100 mg. for the two samples respectively. This change in viscosity is also noticed when the urea containing sample is extruded in a capillary rheometer, commonly called a "melt indexer" similar to that described in ASTM D-1238. The inversed viscosity or "melt index" at 182° C., a load of 100 lbs. and an orifice $L/D=4$ changes from approximately 10 g./10 minutes to 1,100 g./10 minutes for the virgin polymer and the urea-containing polymer respectively. This indicates that urea-modified urethanes can be thermoplastically deformed at considerably lower processing temperatures, thereby decreasing the danger of thermal degradation during fabrication such as extrusion or injection molding.

EXAMPLE 4

A urethane polymer is prepared as in Example 3. The polymer is dry-blended with about 1.76% sym. dioctadecylurea and mixed in a Banbury attachment to the Brabender plastograph for about 20 minutes at about 180° C. A lowering in consistency is noticed on the plastograph as compared to a control without the sym. dioctadecylurea. The modified urethane polymer is then extruded in a capillary rheometer or "melt indexer" which indicates greatly improved flow of the polymer. The "melt index" as defined in Example 3 is 45 g./10 minutes for a control sample and 220 g./10 minutes for the sample containing 1.76% sym. dioctadecylurea. This corresponds to a considerable lowering in extrusion temperature when the modified polymer is extruded in the form of a hose or cable jacketing.

It is of course, to be understood that a processing of any polyurethane polymer can be improved by utilizing any urea compound within the formulas shown above and therefore, any of these materials may be used in place of the particular materials set forth in the examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process for improving the processability of substantially linear polyurethane polymers having an NCO content less than one percent by weight and prepared by the process which comprises reacting an organic compound containing active hydrogen atoms which are reactive with NCO groups, and a chain extending agent with an organic diisocyanate which comprises adding to the polymer from about 0.0001 to about 0.05 mol per 100 parts of the polymer of a urea having a formula selected from the group consisting of

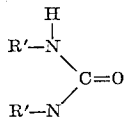

and

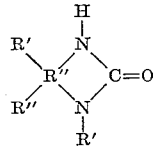

R' is selected from the group consisting of hydrogen, aryl and alkyl having from 1–18 carbon atoms and R" is a divalent radical having from 1–3 carbon atoms, wherein R' in the first formula is a member selected from the group consisting of hydrogen and alkyl at least once in the molecule.

2. A process for improving the processability of substantially linear polyurethane polymers having an NCO content less than one percent by weight and prepared by the process which comprises reacting an organic compound containing active hydrogen atoms which are reactive with NCO groups, and a chain extending agent with an organic diisocyanate which comprises adding to the polymer from about 0.001 to about 0.005 mol per 100 parts of the polymer of a urea having a formula selected from the group consisting of

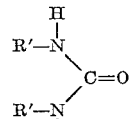

and

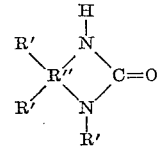

R' is selected from the group consisting of hydrogen, aryl and alkyl having from 1–18 carbon atoms and R" is a divalent radical having from 1–3 carbon atoms, wherein R' in the first formula is a member selected from the group consisting of hydrogen and alkyl at least once in the molecule.

3. A process for improving the processability of substantially linear polyurethane polymers having an NCO content less than one percent by weight and prepared by the process which comprises reacting an organic compound containing active hydrogen atoms which are reactive with NCO groups, and a chain extending agent with an organic diisocyanate which comprises adding to the polymer from about 0.0001 to about 0.005 mol per 100 parts of the polymer of a urea having a formula

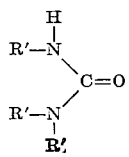

R' is selected from the group consisting of hydrogen, aryl and alkyl having from 1–18 carbon atoms and R' is a member selected from the group consisting of hydrogen and alkyl at least once in the molecule.

4. A process for improving the processability of substantially linear polyurethane polymers having an NCO content less than one percent by weight and prepared by the process which comprises reacting an organic compound containing active hydrogen atoms which are reactive with NCO groups, and a chain extending agent with an organic diisocyanate which comprises adding to the polymer from about 0.0001 to about 0.005 mol per 100 parts of the polymer of a urea having a formula

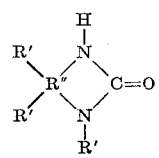

R' is selected from the group consisting of hydrogen, aryl and alkyl having from 1–18 carbon atoms and R" is a divalent radical having from 1–3 carbon atoms.

5. The process of claim 1 wherein the organic compound is selected from the group consisting of dihydric polyesters prepared by reacting a dihydric alcohol with a dicarboxylic acid, polyalkylene ether glycols, polyalkylene thioether glycols and dihydric polyacetals.

6. The process of claim 1 wherein the organic diisocyanate is tolylene diisocyanate.

7. The process of claim 1 wherein the organic diisocyanate is 4,4'-diphenylmethane diisocyanate.

References Cited by the Examiner

UNITED STATES PATENTS

| | | | |
|---|---|---|---|
| 2,625,532 | 1/1959 | Seeger | 260—75 |
| 2,911,394 | 11/1959 | Brooks et al. | 260—30.8 |
| 2,929,800 | 3/1960 | Hill | 260—75 |
| 2,975,146 | 3/1961 | Rogers et al. | 260—75 |

MORRIS LIEBMAN, *Primary Examiner.*

B. A. AMERNICK, *Assistant Examiner.*